United States Patent Office 3,001,373
Patented Sept. 26, 1961

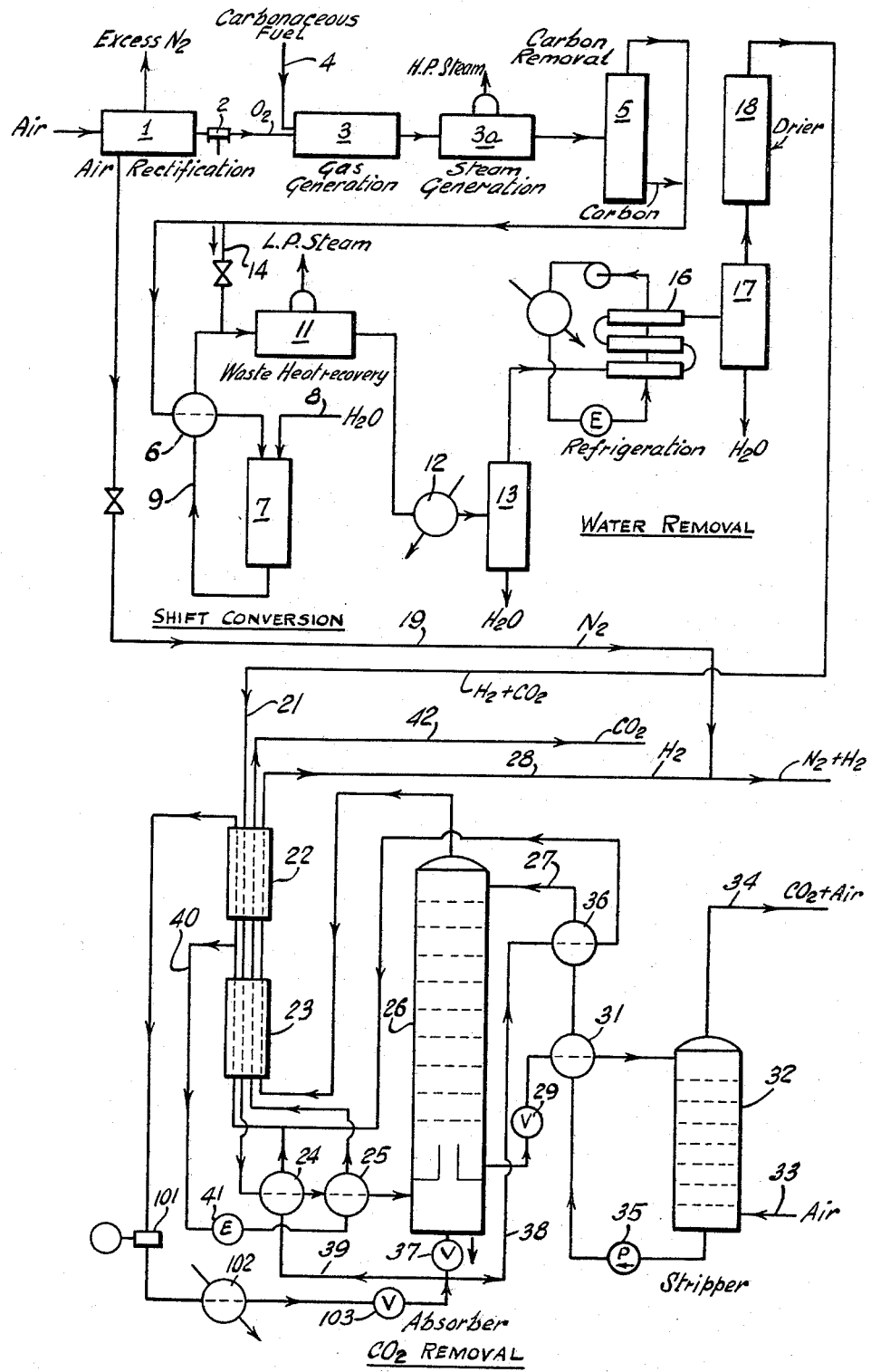

3,001,373
SEPARATION OF CARBON DIOXIDE FROM GASEOUS MIXTURES
Du Bois Eastman, Whittier, and Warren G. Schlinger, Altadena, Calif., assignors to Texaco Inc., a corporation of Delaware
Filed Apr. 11, 1958, Ser. No. 727,997
6 Claims. (Cl. 62—17)

This invention relates to a process for the production of hydrogen. In one of its more specific aspects it relates to a process for selective absorption of carbon dioxide from a mixture of carbon oxides, hydrogen, and gaseous hydrocarbons. The process is applicable to the selective removal of carbon dioxide from hydrogen, carbon monoxide, methane, and similar fixed gases.

The problem of separation of carbon dioxide from a mixture of gases is often encountered in chemical processes. Water and other selective solvents, such as diethanolamine, are commonly used for this purpose. Where large volumes of gas are treated, particularly gaseous mixture containing a relatively high carbon dioxide content, removal of carbon dioxide by these processes becomes a costly operation.

The process of this invention effects removal of carbon dioxide by partial condensation and absorption in a selective absorbent which may be stripped of absorbed carbon dioxide at substantially atmospheric pressure at atmospheric temperature or below. Preferably a hydrocarbon distillate fraction having a boiling range not above the kerosene boiling range, for example, Stoddard solvent, is preferred. An important advantage of the process of this invention results from the fact that it is not necessary to heat the solvent to an elevated temperature to release the absorbed carbon dioxide therefrom.

This application is a continuation-in-part of our copending application Serial No. 588,855, filed June 1, 1956, now Patent No. 2,870,868.

Recently there has been considerable interest in the production of hydrogen by partial oxidation of a carbonaceous fuel to a mixture of carbon monoxide and hydrogen followed by reaction of carbon monoxide with steam in the water gas shift reaction to produce hydrogen and carbon dioxide, and removal of the carbon dioxide from the gas stream to give a relatively pure stream of hydrogen. For each mol of carbon monoxide reacted with steam in the water gas shift reaction, a mol of hydrogen is produced, together with a mol of carbon dioxide. Removal of the carbon dioxide is necessary to produce a pure hydrogen stream.

Gaseous, liquid, or solid fuels may be converted to carbon monoxide and hydrogen by reaction at elevated temperatures with free oxygen to which may be added either steam or carbon dioxide. Mixtures of carbon monoxide and hydrogen are produced also when normally gaseous hydrocarbons are reacted with steam. By-product gases from various petroleum refinery operations, for example, catalytic reforming, are rich in hydrogen but contain also gaseous or gasiform hydrocarbons. Such refinery gas streams, and similar streams, may be processed for the production of hydrogen by conversion of the hydrocarbon content therein to carbon monoxide and hydrogen by either the steam-hydrocarbon reforming reaction or by partial oxidation with free oxygen. The gaseous mixture obtained from any of these processes comprises chiefly carbon monoxide and hydrogen together with minor amounts of other fixed gases. After conversion of the carbon monoxide to carbon dioxide by the water gas shift reaction, and removal of carbon dioxide, relatively pure hydrogen may be obtained.

There is also considerable interest at the present time in the production of fuel gas from solid fuels, for example, coal and oil shale, and from low grade liquid fuels, such as heavy crude oils or crude residua. These fuels may be converted to carbon monoxide and hydrogen by reaction at elevated temperatures, for example, from 2000 to about 3500° F. with oxygen supplemented with steam or carbon dioxide. The product gas so obtained is generally unsuitable as fuel gas for domestic distribution, since it contains relatively large amounts of toxic carbon monoxide. The carbon monoxide content of the gas may be reduced to the extent desired by subjecting the gas to the water gas shift reaction, followed by removal of carbon dioxide. It may be resirable to increase the heating value of the gas, e.g., by synthesis of methane from carbon monoxide and hydrogen in the presence of a suitable catalyst, for example, iron oxide, nickel, or molybdenum sulfide, at a temperature in the range of 1000 to 1800° F. The methanization reaction also produces carbon dioxide as a by-product.

The present invention takes advantage of the solubility of carbon dioxide in light hydrocarbon to provide a method of effecting removal of carbon dioxide from those gases most commonly associated therewith in various commercial processes. These gases are generally carbon monoxide, hydrogen, nitrogen, and gaseous hydrocarbons.

The process of this invention is effective for the removal of carbon dioxide from one or more other gases of lower boiling point than carbon dioxide. It is most generally useful for the separation of carbon dioxide from hydrogen. If desired, carbon dioxide may be separated from carbon monoxide by the process of this invention. Generally it is desirable to remove both carbon monoxide and carbon dioxide from hydrogen. The process of this invention may be used for this purpose.

Often sulfur-containing gases, for example, hydrogen sulfide, carbon disulfide, carbonyl sulfide, or sulfur dioxide, are contained in the gas stream. The process of this invention may be used for the removal of sulfur-containing gases as well as, or together with, carbon dioxide.

In the process of this invention, carbon dioxide is selectively removed from a mixture comprising carbon dioxide and at least one other gas of lower boiling point by partial liquefaction of carbon dioxide, separation of resulting liquid from residual gas phase, and contacting the residual gas mixture with a light hydrocarbon, preferably a normally liquid light distillate, at superatmospheric pressure and at a temperature below about 80° F. and preferably below about 0° F., but not below about −100° F. and generally not below about −70° F. The lower temperature limits are those at which solid carbon dioxide or carbon dioxide complexes form in the system, or the hydrocarbon becomes excessively viscous. These limiting temperatures vary somewhat with the composition of the system and the pressure at which the operation is carried out. In general, it is desirable to operate at the lower temperatures, within practical limits, to obtain the benefit of the increased solubility at the low temperatures.

In carrying out the process of this invention, a stream of gas containing carbon dioxide admixed with lower boiling gases is cooled at superatmospheric pressure, for example, from about 50 to 1000 pounds per square inch gauge, preferably at a pressure of at least 200 pounds per square inch gauge, to a temperature below the dew point of the carbon dioxide to condense carbon dioxide from the mixture. The condensed carbon dioxide is separated from the uncondensed gases, hereinafter termed the residual gas mixture. The residual gas mixture is contacted at said elevated pressure with a light hydrocarbon, preferably a normally liquid light distillate, at a reduced temperature, preferably below about 40° F. effecting removal of the carbon dioxide from the gas stream and enrichment of the hydrocarbon with absorbed carbon dioxide. The rich absorbent is subjected to expansion to a lower pressure, preferably less than 50 p.s.i.g. and suitably near atmospheric pressure, which results in cooling of the hydrocarbon-carbon dioxide mixture to a lower temperature. The cold hydrocarbon-carbon dioxide mixture is heat exchanged with the lean absorbent and with the incoming gas stream to maintain the desired low temperature in the absorption system. Separation of carbon dioxide from the lean absorbent may be accomplished by blowing the absorbent liquid with a stripping gas at about atmospheric temperature.

The temperature required for condensation of carbon dioxide depends upon the pressure at which the gas mixture is treated, as evidenced by the following table.

TABLE 1

*Boiling points of pure components (° F.)*

|  | 5 atm. | 20 atm. | 40 atm. | 60 atm. |
|---|---|---|---|---|
| Carbon dioxide | −70 | −2 | 43 | 72 |
| Carbon monoxide | −275 | −237 | (−217) | (−217) |
| Hydrogen | −411 | (−400) | (−400) | (−400) |
| Methane | −217 | −163 | −123 | (−116) |
| Nitrogen | −290 | −251 | (−233) | (−233) |

NOTE.—The numbers in parentheses in the above table are critical temperatures of the gases, the pressure in each instance being above the critical pressure of the particular substance.

It will be evident from the foregoing table that there is a wide difference in boiling points between carbon dioxide and those gases most commonly associated therewith in commercial processes. Carbon dioxide has a liquefaction temperature well above that of hydrogen, nitrogen, carbon monoxide, and methane, the gases most commonly associated with carbon dioxide.

Hydrocarbons which may be used include butane, pentane, isopentane, hexanes, heptanes, and light distillate fractions. Light distillate fractions having atmospheric boiling ranges lying within the range of 100 to 500° F. are preferred. Gasoline and light naphthas, e.g. Stoddard solvent, are particularly effective solvents.

The solubility of carbon dioxide in Stoddard solvent at various pressures and temperatures is indicated in the following table wherein the solubility is expressed in terms of standard cubic feet of carbon dioxide per 1000 gallons of Stoddard solvent.

TABLE 2

*Solubility of carbon dioxide in Stoddard solvent*

| Pres. (p.s.i.g.) | Temperature (° F.) | | | | | | | |
|---|---|---|---|---|---|---|---|---|
|  | −60° | −40° | −20° | 0° | 20° | 40° | 60° | 80° |
| 0 | 994 | 733 | 547 | 422 | 330 | 269 | 222 | 181 |
| 50 | 4,521 | 3,283 | 2,403 | 1,855 | 1,474 | 1,200 | 978 | 823 |
| 100 |  | 6,739 | 4,578 | 3,488 | 2,737 | 2,194 | 1,811 | 1,336 |
| 150 |  |  | 8,697 | 6,268 | 4,810 | 3,751 | 3,106 | 2,380 |
| 200 |  |  | 11,709 | 8,113 | 6,040 | 4,693 | 3,751 | 2,688 |

NOTE.—The blanks in the above table represent regions in which no separate gas phase is present in the carbon dioxide-Stoddard solvent system.

Stoddard solvent is a straight run hydrocarbon distillate fraction, highly paraffinic in character, having an atmospheric pressure boiling range in the range of 300 to 400° F.

The Stoddard solvent on which the data in the above table is given has an A.P.I. gravity of 48° and a molecular weight 136. The 10 percent, 50 percent, and 90 percent points on the Engler distillation are 322° F., 328° F., and 342° F., respectively.

With reference to the drawing, which illustrates a specific example of an application of the process of this invention to the production of ammonia synthesis feed gas, air is rectified in a rectification plant 1 to yield a substantially pure nitrogen fraction and an oxygen-rich fraction, containing in excess of approximately 90 percent oxygen by volume, preferably on the order of 95 percent oxygen by volume. Nitrogen is available from the rectification plant in substantially pure form for use as indicated later. A stream of the oxygen fraction from the rectification plant is passed to a compressor 2 and delivered to a synthesis gas generator 3.

Carbonaceous fuel, preferably preheated, is passed through line 4 to a synthesis gas generator 3. The oxygen and fuel preferably are separately introduced into the generator and mixed with one another within the generator. In the case of liquid hydrocarbons or solid fuel, e.g. coal, steam is preferably supplied to the generator with the fuel. Steam may be supplied in admixture with the oxygen or the carbonaceous fuel. The preferred synthesis gas generator is a compact, unpacked reaction zone having a relatively small amount of surface in relation to its volume as disclosed in U.S. Patent 2,582,938 to Du Bois Eastman and Leon P. Gaucher. The synthesis gas generator is autogenously maintained at a temperature above about 2,250° F. by reaction between the oxygen and hydrocarbon. The hydrocarbon may be gaseous, for example, natural gas, or liquid, e.g. fuel oil.

Raw synthesis gas from the gas generator, containing large amounts of hydrogen and carbon monoxide, is discharged from the synthesis gas generator through a boiler 3a for generation of high pressure steam to a gas scrubbing unit 5, preferably a water scrubber, which removes solid particles, e.g. unconverted carbon, from the gas stream. Scrubbing with water also cools the gas stream to a temperature corresponding to the boiling point of water at the existing partial pressure. The water-washed gas is discharged from the carbon removal unit through heater exchanger 6 where it is heated to a temperature on the order of 700 to 750° F. The preheated gas is passed into shift converter 7 operated at a temperature of 700 to 750° F. Water or steam, as required, is supplied to the shift converter through line 8. Carbon monoxide, which generally comprises approximately 30 percent by volume of the synthesis gas, is almost completely reacted with steam in the shift converter, preferably in the presence of iron catalyst, to form equivalent amounts of hydrogen and carbon dioxide. The product gas from the shift converter is at a temperature of about 750° F. and contains approximately 1.5 percent nitrogen by volume and approximately 2 percent residual carbon monoxide by volume on a dry, carbon dioxide-free basis.

The product from the shift converter passes through line 9 to heat exchanger 6 where it supplies heat necessary to preheat the gas feed stream to the shift converter. This gas stream is passed through a second boiler for the recovery of heat from the gas stream with the generation of low pressure steam, and is further cooled in a cooler 12 to condense water therefrom. Water condensed from the gas stream is separated from the gas in separator 13.

If desired, as in the case in which fuel gas is the final product, part of the product gas may bypass the shift conversion step, e.g. a controlled amount may be so bypassed through line 14.

The gas stream is further cooled by refrigeration in refrigerated coils 16 to a temperature of about 40° F. Condensed water is separated from the gas stream in separator 17. The partially dried gas then passes through a drier 18 containing alumina to reduce the water vapor to less than two parts per million (i.e. dew point less than −60° F.). Silica gel or other desiccant may be used in place of alumina in the drier.

The dry gas stream comprising hydrogen and carbon dioxide enters the $CO_2$ removal system through line 21 and passes successively through heat exchangers 22, 23, 24, and 25 into the lower portion of absorber 26.

In passing through the heat exchangers, the feed gas stream is cooled to a temperature below the dew point of carbon dioxide effecting condensation of a major portion of the carbon dioxide (generally about 60 to 80 percent) which is separated from the uncondensed residual gas stream in the lower portion of the absorber. The resulting stream of hydrogen containing a minor portion of the carbon dioxide is contacted with light hydrocarbon liquid, for example, Stoddard solvent, in the absorber. The absorber is a countercurrent liquid-vapor contacting apparatus with bubble trays or equivalent means effective for intimate countercurrent contact between gas and liquid absorbent.

Light hydrocarbon liquid is introduced into the top of absorber 26 through line 27. The absorber is operated at substantially the pressure of the incoming gas stream. The purified gas stream leaving the top of the absorber is passed through heat exchangers 23 and 22, successively, where it passes in indirect heat exchange with incoming feed, and is discharged from the system through line 28. The purified gas stream contains substantially all of the hydrogen from the feed stream together with about 1/10 of 1 percent by volume of carbon dioxide.

Rich absorbent containing absorbed or dissolved carbon dioxide is withdrawn from the lower portion of absorber 26, and passed through an expansion valve 29, in which its pressure is reduced with an accompanying reduction in temperature. Expanded rich absorbent then passes through heat exchanger 31 in indirect heat exchange with lean absorbent as later described. The rich absorbent enters the upper part of stripper 32 where it is stripped with air or inert gas, suitably at a temperature in the range of 60 to 100° F. Stripping medium enters the lower portion of the stripper through line 33. Stripping medium and gases stripped from the rich absorbent are discharged from the stripper through line 34. Air, hydrocarbon gas, and nitrogen are suitable stripping media.

Generally, an absorber having the equivalent of about 32 theoretical plates and a stripper with the equivalent of about 6 theoretical plates are adequate.

Lean absorbent withdrawn from the bottom of the stripper is passed by pump 35 through heat exchanger 31 in countercurrent indirect heat exchange with rich absorbent from the lower portion of absorber 26 and then through heat exchanger 36 in indirect heat exchange with liquefied carbon dioxide condensed from the original gas stream. Cooled lean absorbent is introduced through line 27 into the top of absorber 26.

As explained previously, the incoming gas stream is cooled to condense the major portion of the carbon dioxide contained therein. Condensate is withdrawn from the bottom of absorber 26 through reducing valve 37 where the pressure is reduced. Part of the condensate is passed through line 38 to heat exchanger 36 where it is evaporated in heat exchange with lean absorbent. A second portion is withdrawn through line 39 and evaporated in heat exchanger 24 in indirect heat exchange with the feed gas stream. The vaporized carbon dioxide from heat exchanger 36 its combined with that from heat exchanger 24 and passed through heat exchanger 23 in indirect heat exchange with incoming feed gas. Part or all of the resulting carbon dioxide stream is then passed through line 40 to expansion engine 41 where it is expanded to near-atmospheric pressure effecting further cooling. The expanded gas is passed through heat exchanger 25, then through heat exchangers 23 and 22, successively, in indirect heat exchange with feed gas stream. Carbon dioxide, a valuable by-product of the process, is discharged from the system through line 42.

With gas streams relatively lean in carbon dioxide, and with operation at relatively high pressure, e.g. 500 p.s.i., no auxiliary refrigeration is necessary. In some instances, however, it is necessary to supply some refrigeration in addition to that available from the gas stream itself, as described above. For this purpose, compressor 101, cooler 102, and expander 103 are provided in the system to effect additional refrigeration of the incoming feed gas stream. This is accomplished by utilizing part of the carbon dioxide from the feed gas stream as refrigerant in a compression refrigeration system. In the auxiliary refrigeration cycle, carbon dioxide is compressed, condensed, expanded, and evaporated in heat exchange with the incoming feed stream.

When the auxiliary refrigeration system is used, carbon dioxide leaving heat exchanger 23 is split into two streams, one of which is passed through line 40 to expander 41, and the other of which is passed through heat exchanger 22 to compressor 101. The portion passing to compressor 101 is compresed, condensed, in condenser 102, and expanded in expander 103. Carbon dioxide, thus liquefied, is fed into line 38 to supplement the refrigeration of the feed gas stream in heat exchangers 22, 23, and 24.

Obviously, various combinations and arrangements of heat exchange steps may be worked out, depending upon the volumes and temperature of the various streams.

EXAMPLE 1

In this example, Pittsburgh bituminous coal of the following composition is used:

*Ultimate analysis of coal*

| | |
|---|---|
| Carbon | 78.0 |
| Hydrogen | 5.3 |
| Sulfur | 1.9 |
| Nitrogen | 1.5 |
| Oxygen | 5.6 |
| Ash | 7.7 |

This coal has a higher heating value of 13,500 B.t.u., dry basis.

The powdered coal suspended in steam is supplied at the rate of 2,670 pounds per hour to a flow-type synthesis gas generator where it is gasified in suspension by reaction with pure oxygen at 515 p.s.i.a and 2200° F. Oxygen is supplied to the generator at ambient temperature at the rate of 23,440 s.c.f.h. and steam at the rate of 2920 pounds per hour. The coal and steam are preheated to 570° F. The raw product gas has the following composition, expressed, in mol percent, dry basis:

*Raw product gas*

| | |
|---|---|
| Hydrogen | 43.6 |
| Carbon monoxide | 36.8 |
| Carbon dioxide | 17.5 |
| Methane | 1.6 |
| Nitrogen | 0.3 |
| Hydrogen sulfide | 0.2 |

The product gas is cooled, washed with water, reheated to 750° F. and passed over an iron oxide shift conversion catalyst where carbon monoxide is reacted with steam to produce carbon dioxide and hydrogen. After water removal, the gas is fed to the $CO_2$ removal system described hereinabove. The gas feed to the carbon dioxide removal system has the following composition, expressed in mol percent:

*Feed gas to $CO_2$ removal*

| | Mol Percent | Mols |
|---|---|---|
| Hydrogen | 57.8 | 102.0 |
| Carbon Monoxide | 1.6 | 2.9 |
| Carbon Dioxide | 38.5 | 68.0 |
| Methane | 1.6 | 2.8 |
| Nitrogen | 0.3 | 0.4 |
| Hydrogen Sulfide | 0.2 | 0.3 |

The dried gas stream is fed at 80° F. to the carbon dioxide removal system, illustrated and described above, at the rate of 67,200 s.c.f.h., and cooled by heat exchange as illustrated to −60° F. prior to its introduction into the lower portion of the absorber. The fresh feed stream is cooled as it passes successively through heat exchangers 22, 23, 24, and 25 to 34.7° F., −25.5° F., −58° F., and −60° F., respectively, effecting condensation of a major portion of the carbon dioxide contained in the feed stream. In this example, approximately 65 percent of the carbon dioxide in the feed stream, or 44.2 mols, is condensed, and withdrawn as a liquid from the lower portion of absorber 26 through expansion valve 37 where it is expanded to 80 p.s.i.a. Carbon monoxide contained in the feed gas to the carbon dioxide removal unit is absorbed in the liquefied carbon dioxide.

The uncondensed portion of the feed gas stream, after separation of liquefied components, is contacted in the absorber with Stoddard solvent at −60° F. and at the rate of 100 mols of solvent per hour. The hydrogen stream, approximately 100 mols per hour, leaving the absorber at 500 p.s.i.a. and −60° F. contains nitrogen and minor amounts of carbon monoxide and carbon dioxide. The hydrogen stream passes successively through heat exchangers 23 and 22 wherein its temperature is raised to 5° F. and 65° F., respectively, and discharged through line 28 where it is mixed with nitrogen from the air rectification step (supplied via line 19) for ammonia synthesis feed gas.

Rich absorbent is withdrawn from the lower portion of the absorber above the section in which phase separation of the incoming feed stream takes place. The rich absorbent at −47.7° F. and 500 p.s.i.a is expanded through expander 29 to 20 p.s.i.a. and −55.5° F. The cold expanded absorbent passes in heat exchange with warm lean absorbent (80° F. and 500 p.s.i.a.) where the rich absorbent is warmed to 63° F. while the lean absorbent is cooled to −45° F. (heat exchanger 31). In the stripper, the rich absorbent is stripped of its absorbed components by the introduction of approximately 1900 s.c.f. of air per hour at atmospheric temperature (nominally 80° F.). The absorbed carbon dioxide, amounting to approximately 23.8 mols, together with minor amounts of hydrogen sulfide, methane, and hydrogen, and about 0.7 mol per hour of Stoddard solvent, is discharged from the stripper at 65° F. and substantially atmospheric pressure.

Condensate carbon dioxide separated from the gas feed stream in the lower portion of absorber 26 is withdrawn from the absorber at 500 p.s.i.a. and −60° F. and expanded through expander 37 to 80 p.s.i.a. and −67° F. Carbon dioxide at the reduced pressure is split into two streams as previously described. One of the streams, amounting to approximately 15.9 mols per hour, is passed in heat exchange with lean absorbent (heater exchanger 36), cooling the lean absorbent from −45° F. to −60° F. and vaporizing carbon dioxide. The remainder of the liquid carbon dioxide (28.3 mols per hour) supplemented by an additional 18.7 mols per hour liquid carbon dioxide from the refrigeration cycle (compressor 101, cooler 102, and expander 103) is passed in heat exchange with the incoming raw feed gas cooling the feed gas stream (in heat exchanger 24) from −25.5° F. to −58° F. The vaporized carbon dioxide streams from the lean oil heat exchange and from the feed gas heat exchange are combined and passed (through exchanger 23) in indirect heat exchange with the incoming feed gas, warming the carbon dioxide stream to about 5° F. The carbon dioxide is again split into two streams, one of which is expanded from 80 p.s.i.a. and 5° F. to 20 p.s.i.a and −102° F. (in expansion engine 41). This stream amounts to approximately 44.2 mols per hour. The cold carbon dioxide from the expansion engine is passed in heat exchange with the incoming feed gas stream in successive heat exchange steps as illustrated in the figure (exchangers 25, 23 and 22), in which the carbon dioxide stream is warmed successively to −67° F., 5° F. and 65° F. The carbon dioxide at 65° F. is discharged from the system at approximately atmospheric pressure. The other stream of gaseous carbon dioxide, at 5° F., is passed in heat exchange with incoming fresh feed wherein it is warmed to 65° F. (exchanger 22). This stream of carbon dioxide, amounting to about 18.7 mols per hour, is compressed to 1000 p.s.i.a. in compressor 101, cooled to 80° F. in cooler 102 effecting condensation of the carbon dioxide, expanded to 80 p.s.i.a. in expander 103 and recirculated to line 39, as illustrated in the figure, to supply additional refrigeration for cooling and partially condensing the incoming feed gas stream.

EXAMPLE 2

A gas stream consisting of carbon dioxide and hydrogen and containing 1.19 mols carbon dioxide per mol of hydrogen is supplied to the $CO_2$ removal system as illustrated and described above, at 80° F. and 515 p.s.i.a. at the rate of 84,595 s.c.f.h. (standard cubic feet per hour at 60° F. and 14.7 p.s.i.a.). The feed contains 102.0 mols hydrogen and 121.2 mols carbon dioxide. In passing through the heat exchangers 22, 23, 24, and 25, the feed gas stream is cooled successively to 40° F., −10.1° F., −56.2° F. and −60° F. by indirect heat exchange with various process streams; the resulting partially condensed feed stream is introduced into the lower portion of the absorber at 500 p.s.i.a. and −60° F. In this example, 97.3 mols of carbon dioxide, or about 80 percent of the carbon dioxide in the feed, is condensed.

Stoddard solvent at −60° F. is introduced at the rate of 100 mols per hour into the top of absorber 26 through line 27. The absorber is operated at 500 p.s.i.a.

The cold hydrogen-rich product gas at −60° F. from the top of absorber 26 is passed through heat exchanger 23 where it absorbs heat from the incoming gas stream, raising the temperature of the product gas to about 5° F., then through heat exchanger 22, where the product gas is warmed up to 69° F. at which temperature it is discharged through line 28.

Rich absorbent withdrawn from the lower portion of the absorber at −47.7° F. and 500 p.s.i.a. is expanded through expander 29 to 20 p.s.i.a. and −55.5° F. The cold expanded absorbent passes in heat exchange with warm lean absorbent at 80° F. and 500 p.s.i.a. in heat exchanger 31 wherein the rich absorbent is warmed to 63° F. while the lean absorbent is cooled to −45° F.

Stripping of the absorbent is accomplished at 20 p.s.i.a. with 1900 s.c.f.h. of air at 80° F. The stripping air effects release of absorbed carbon dioxide, amounting to 23.8 mols per hour, together with 2.0 mols per hour hydrogen, and 0.07 mol (or 9 pounds) of entrained absorbent, which are discharged from the stripper at 65° F.

The lean absorbent from the stripper cooled from 80° F. to −45° F. in heat exchanger 31 as described above, and further cooled to −60° F. in heat exchanger 36.

Liquefied carbon dioxide withdrawn from absorber 26 is reduced to 80 p.s.i.a. at expansion valve 37. At this pressure liquid carbon dioxide has a boiling point of −67.1° F. About 13.0 mols per hour are passed through line 38 and vaporized in heat exchanger 36 in heat exchange with lean absorbent, cooling the lean absorbent to −60° F. The remainder, about 84.3 mols per hour, is evaporated in heat exchanger 24 to cool the incoming gas stream. The carbon dioxide from exchangers 24 and 36 are combined and the combined stream passed through heat exchanger 23 where the carbon dioxide stream is warmed up to 54° F. The gas stream is further expanded in engine 41 from 80 p.s.i.a. to 20 p.s.i.a. which drops the temperature of the carbon dioxide stream to about −102.5° F. In heat exchanger 25, the temperature of the carbon dioxide stream is increased to −67° F.; in heat exchangers 23 and 22, the temperature of the carbon dioxide stream increases to 5° and 69° F., respectively. Carbon dioxide is discharged from the system through line 42 at approximately 70° F.

It is evident from the foregoing examples that the present invention provides a process for the removal of carbon dioxide which effectively takes advantage of energy available in high pressure gas streams to separate carbon dioxide by partial liquefaction and absorption at low temperatures, much if not all of which are obtained by auto-refrigeration.

Although light hydrocarbons are treated as preferred absorbents throughout this disclosure, the process is also operable with other absorption liquids having a selective solvent action for carbon dioxide. Known solvents which are suitable for use in the process include simple oxygenated hydrocarbons, e.g. alcohols, ketones, and aldehydes, specifically methanol, acetone, and acetaldehyde.

Obviously, many modifications and variations of the invention, as hereinbefore set forth, may be made without departing from the spirit and scope thereof, and therefore only such limitations should be imposed as are indicated in the appended claims.

We claim:

1. A process for the separation of carbon dioxide from a gas stream comprising carbon dioxide in admixture with hydrogen which comprises cooling said mixture at a pressure of at least 200 p.s.i.g. to a temperature sufficiently below the dew point of carbon dioxide in said mixture that condensation of a major portion of said carbon dioxide from said mixture is effected, withdrawing resulting liquefied carbon dioxide from contact with residual gas comprising hydrogen and a minor portion of said carbon dioxide, contacting said residual gas in an absorption zone with an organic liquid absorbent effective for selective absorption of carbon dioxide at said pressure and at said reduced temperature effecting substantially complete absorption of said carbon dioxide, withdrawing from said absorption zone said absorbent containing absorbed carbon dioxide, reducing the pressure on said withdrawn carbon dioxide to a pressure at which the boiling point of liquid carbon dioxide is below the condensation temperature of carbon dioxide in said feed gas mixture but above atmospheric pressure, effecting heat exchange between said liquid carbon dioxide at said reduced pressure and the incoming feed gas mixture effecting condensation of carbon dioxide from said feed gas, effecting expansion of gaseous carbon dioxide resulting from vaporization of liquid carbon dioxide at said reduced pressure to a substantially lower pressure whereby the temperature of the gaseous carbon dioxide is substantially lowered, and passing resulting low temperature gaseous carbon dioxide in indirect heat exchange with said feed gas following cooling of said feed gas by vaporization of said liquid carbon dioxide whereby the temperature of said feed gas is further reduced.

2. A process according to claim 1 wherein said gaseous carbon dioxide at said reduced pressure and prior to expansion is passed in indirect heat exchange with said feed gas mixture comprising carbon dioxide and hydrogen supplied to said absorption zone prior to heat exchange with said liquid carbon dioxide.

3. A process according to claim 1 wherein a portion of said gaseous carbon dioxide resulting from vaporization of liquid carbon dioxide is compressed and liquefied and resulting liquid carbon dioxide is vaporized in indirect heat exchange with said feed gas mixture comprising carbon dioxide and hydrogen effecting additional cooling and liquefaction of carbon dioxide in said feed gas mixture.

4. A process for the separation of carbon dioxide from a gas stream comprising carbon dioxide in admixture with hydrogen which comprises cooling said mixture at a pressure of at least 200 p.s.i.g. to a temperature sufficiently below the dew point of carbon dioxide that condensation of a major portion of said carbon dioxide from said mixture is effected, withdrawing resulting liquefied carbon dioxide from contact with residual gas comprising hydrogen and a minor portion of said carbon dioxide, contacting said residual gas in an absorption zone with an organic liquid absorbent effective for selective absorption of carbon dioxide at said pressure and at said condensation temperature effecting substantially complete absorption of said carbon dioxide, withdrawing from said absorption zone said absorbent containing absorbed carbon dioxide, reducing the pressure of said absorbent containing carbon dioxide to a pressure below about 50 p.s.i.g. effecting evolution of carbon dioxide therefrom substantially without vaporization of said absorbent and with resultant cooling thereof, passing resulting cooled liquid absorbent and carbon dioxide in heat exchange with absorbent free from carbon dioxide prior to contact with said hydrogen and carbon dioxide mixture, effecting removal of carbon dioxide from said absorbent at said reduced pressure, returning absorbent substantially free from carbon dioxide to said heat exchange step and said absorption zone, and withdrawing substantially pure hydrogen free from carbon dioxide as a product of the process.

5. A process according to claim 4 wherein a porton of said liquid carbon dioxide withdrawn from contact with said residual gas is evaporated at reduced pressure in heat exchange with said absorbent free from carbon dioxide following said heat exchange with said absorbent containing carbon dioxide.

6. A process according to claim 5 wherein a portion of said liquid carbon dioxide withdrawn from contact with said residual gas is evaporated in heat exchange with said feed gas mixture at a pressure such that its boiling point is lower than the condensation temperature of carbon dioxide in the feed gas mixture effecting vaporization of said liquid carbon dioxide and simultaneous cooling and condensation of carbon dioxide from said feed gas mixture, and resulting gaseous carbon dioxide is expanded and passed in indirect heat exchange with said feed gas mixture following cooling of said feed gas mixture by vaporization of said liquid carbon dioxide.

References Cited in the file of this patent

UNITED STATES PATENTS

| | | |
|---|---|---|
| 2,465,235 | Kubicek | Mar. 22, 1949 |
| 2,632,316 | Eastman | Mar. 29, 1953 |
| 2,649,166 | Porter et al. | Aug. 18, 1953 |
| 2,844,944 | Becker | July 29, 1958 |
| 2,887,850 | Adams | May 26, 1959 |
| 2,880,591 | Kwauk | Apr. 7, 1959 |